United States Patent
Guerillot et al.

(12) 
(10) Patent No.: US 6,381,543 B1
(45) Date of Patent: Apr. 30, 2002

(54) METHOD FOR FORMING A MODEL OF A GEOLOGIC FORMATION, CONSTRAINED BY DYNAMIC AND STATIC DATA

(75) Inventors: Dominique Guerillot, Rueil Malmaison; Laurent Pianelo, Pau, both of (FR)

(73) Assignee: Institut Francais du Petrole, Rueil-Malmaison cedex (FR)

( * ) Notice: Subject to any disclaimer, the term of this patent is extended or adjusted under 35 U.S.C. 154(b) by 0 days.

(21) Appl. No.: 09/634,583

(22) Filed: Aug. 8, 2000

(30) Foreign Application Priority Data

Sep. 2, 1999 (FR) .......................................... 98 11008

(51) Int. Cl.⁷ ................................................ G01V 1/28
(52) U.S. Cl. ........................................ 702/13; 702/14
(58) Field of Search ............................ 702/11, 12, 13, 702/14, 16; 367/73; 703/10

(56) References Cited

U.S. PATENT DOCUMENTS

| | | | | |
|---|---|---|---|---|
| 5,142,472 A | * | 8/1992 | Day ............................ | 702/12 |
| 5,675,147 A | * | 10/1997 | Ekstrom et al. ............... | 702/11 |
| 5,889,729 A | * | 3/1999 | Frenkel et al. ................. | 367/73 |

FOREIGN PATENT DOCUMENTS

| | | | | |
|---|---|---|---|---|
| EP | 0354112 | 2/1990 | ............ | G01V/1/28 |
| EP | 0745870 | 12/1996 | ............ | G01V/1/28 |
| EP | 0889331 | 1/1999 | ............ | G01V/1/30 |
| WO | 9738330 | 10/1997 | ............ | G01V/1/34 |

OTHER PUBLICATIONS

L. Vernik: "Predicting Lithology and Transport Properties from Acoustic Velocities Based on Petrophysical Classification of Siliciclastics", Geophysics, Mar. 1994, USA, vol. 59, No. 3, pp. 420–42 XP002138796.

* cited by examiner

*Primary Examiner*—Donald E. McElheny, Jr.
(74) *Attorney, Agent, or Firm*—Antonelli, Terry, Stout & Kraus, LLP

(57) ABSTRACT

Method for forming, by means of an inversion technique, a model of an underground zone, constrained by static data: data obtained by seismic exploration or measured in situ (logs), and by dynamic data: production measurement, well testing, etc. From an a priori selected meshed geologic model and from relations between parameters or physical quantities characteristic of the medium: acoustic impedance and cabsolute permeability for example, a simultaneous inversion of the two parameters is performed by minimizing a global cost function, which has the effect of considerably decreasing the number of possible solutions and of improving characterization of the underground zone. The method can be used notably for modelling hydrocarbon reservoirs, of zones likely to be used as gas, waste storage places, etc.

5 Claims, 8 Drawing Sheets

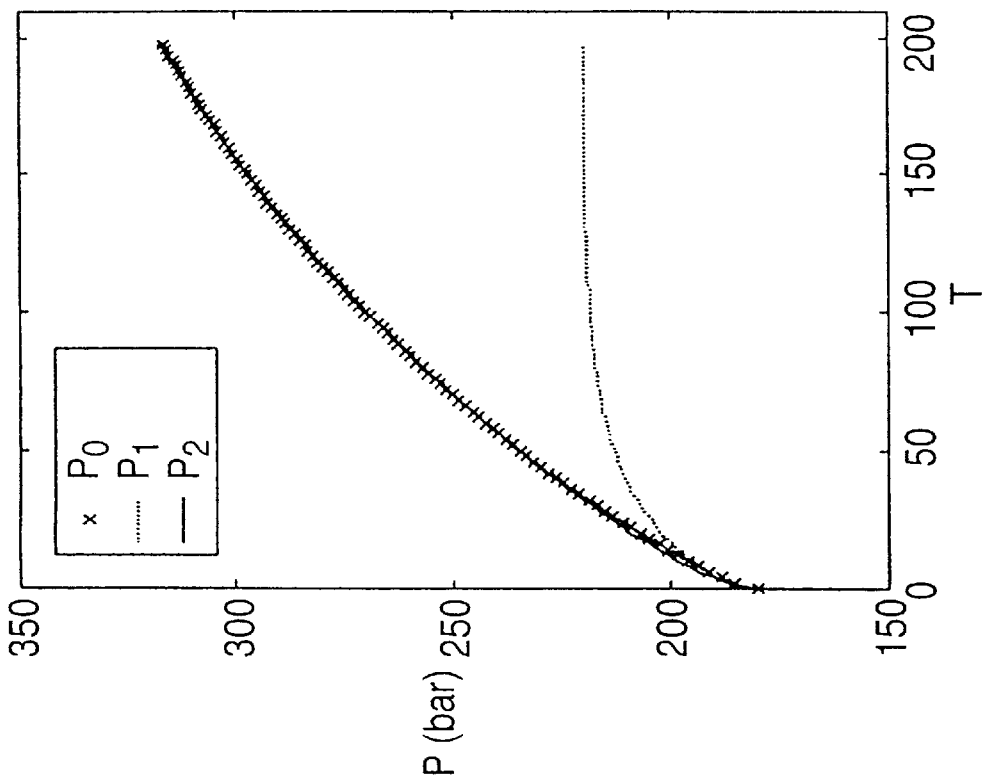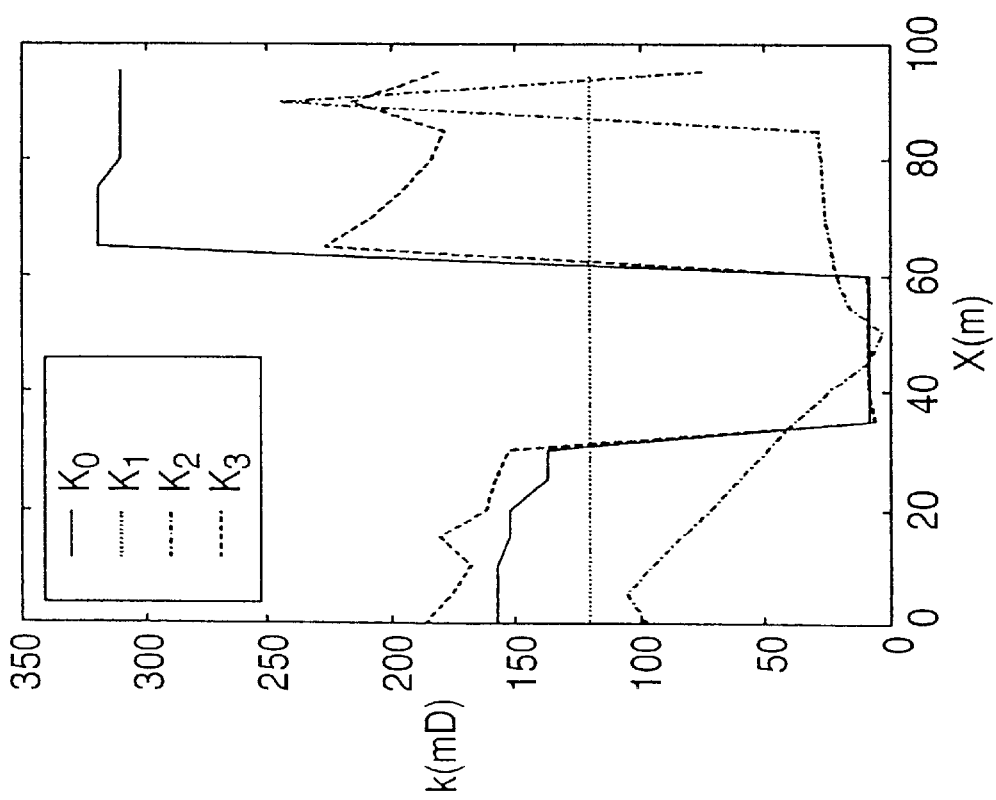

METHOD FOR FORMING A MODEL OF A GEOLOGIC FORMATION, CONSTRAINED BY DYNAMIC AND STATIC DATA

FIELD OF THE INVENTION

The present invention relates to a method for forming a model of an underground zone, constrained both by dynamic data and static data obtained by means of measurements or observations.

One of the main current research means for improving location techniques relative to zones likely to contain hydrocarbons consists in giving better descriptions of the inner architecture of reservoirs. Engineers therefore essentially have two types of data: dynamic data (reservoir) and static data (seismic).

I) BACKGROUND OF THE INVENTION

An inversion technique is commonly used for constructing really representative reservoir models, starting from a geologic model given a priori which is gradually modified in order to reduce the differences between the values of the parameters or physical quantities calculated by the model and values of these quantities that can be observed or measured at certain points of the medium, by best minimizing a cost function J.

The model can be optimized by inversion of static data that can be deduced from seismogram interpretations or that have been obtained by measurements in exploration wells. The most commonly used parameter for inversion is the acoustic impedance of the medium.

The model can also be optimized by inversion of dynamic data: production data spread over a period of time or resulting from well tests. However, the data used concern very localized zones in the immediate neighbourhood of production wells. The parameters used for inversion are here the total permeability of the medium and the porosity thereof In both cases, the inversion algorithm is the algorithm shown in FIG. 1.

The models obtained by inversion of static and dynamic data are achieved separately by specialized reservoir engineering and seismic interpretation teams. The solutions which specialists in these two fields come to are often multiple and generally very different according to whether static data or dynamic data are used.

I-1 Flow Model

Consider a direct one-dimensional model relative to the flow of fluids between an injection well and a production well in a reservoir diagrammatically represented (FIG. 2) by a cylinder of length L extending between the two wells. Knowing the pressure Po of the fluid at an initial time, its evolution within a time interval [0,T] is governed by the following equations defining the direct model:

$$p(x, 0) = p_0(x) \quad \forall x \in [0, L]$$

$$-k(0)\frac{\partial p}{\partial x}(0, t) = q_0(t) \quad \forall t \in ]0, T]$$

$$\frac{\partial p}{\partial t} + \frac{\partial}{\partial x}\left(-k(x)\frac{\partial p}{\partial x}\right) = 0 \quad \forall x \in ]0, L[ \text{ and } \forall t \in ]0, T]$$

$$p(L, t) = p_L \quad \forall t \in ]0, T]$$

where:

$p(x,t)$ is the pressure of the fluid at the time t and at the position x, $k(x)$ is the permeability of the rock at the position x, $q_o(t)$ is the rate of inflow at the time t, $P_L$ is the pressure at the distance L from the injection well, that are solved according to a finite-difference numerical scheme. A description of the permeability at the interfaces inspired by the finite-volume schemes allows to take account of the stream continuity at the interfaces. It is assumed that the reservoir is an << assembly of sections >> of homogeneous lithologies and of different permeabilities to be identified. As pressure measurements have been performed at the injection well, at x=0, the following objective function is constructed:

$$J(k)=\tfrac{1}{2}\int_0^T (p(0,t)-\hat{p}(t))^2 dt$$

and inversion of the parameter or of the physical quantity k is thus achieved by means of conventional optimization methods, such as the adjoint state method which allows accurate calculation of the gradient of the cost function in relation to the parameter.

I-2 Seismic Model

Consider a sedimentary basin (FIG. 3) consisting of several geologic layers, having each their own acoustic impedance, explored by seismic means. Seismograms showing the response of the medium (waves reflected by the subsoil discontinuities) in response to the emission of seismic waves by a source are available. The wave equation is a hyperbolic equation where the unknown y(t,z) is the subsoil vibration depending on the time t and on the depth z, with the acoustic impedance of the medium σ(z) as the parameter. The same type of finte-difference scheme as that used for the flow equation is used to solve this equation, i.e. a scheme using a description of the impedances at the interfaces inspired by the finite-volume schemes. Because of the initial conditions, this is here an explicit scheme. The geologic interfaces located by seismic reflection means are the boundary layers between the media having different acoustic impedances.

The medium being quiescent at the initial time t=0, and knowing the pressure impulse g(t) imparted to the medium at the surface at each time t, vibration y(z,t) is the solution to the direct model given by the following modelling equation system (z being the depth in two-way time):

$$(P_s)\begin{cases} \sigma(z)\frac{\partial^2 y}{\partial t^2} - \frac{\partial}{\partial z}\left(\sigma(z)\frac{\partial y}{\partial z}\right) = 0 & \text{for } z > 0 \text{ and for } t > 0 \\ y(z, 0) = \frac{\partial y}{\partial t}(z, 0) = 0 & \text{for } z \geq 0 \\ -\sigma(0)\frac{\partial y}{\partial z}(0, t) = g(t) & \text{for } t > 0 \\ y(L, t) = 0 & \text{for } t > 0 \end{cases}$$

As above, the medium is considered to be an assembly of sections sliced vertically and having each an impedance value. Measurements ŷ being known, a cost function is constructed:

$$J(\sigma)=\tfrac{1}{2}\int_0^T (y(0, t)-\hat{y}(t))^2 dt$$

which allows to perform the acoustic impedance inversion.

I-3 Problem Linked with Lack of Data

The success of an inversion procedure greatly depends, as it is well-known, on the quality and the quantity of observations available. The more observations, the better the quality of the inversion result. A lack of data leads to averaged information on the parameter to be inverted.

An inverse problem performed on two meshes including information on parameters $p_1$, $p_2$ with an insufficient number of data only allows to obtain the mean value of the two parameters. As for reservoirs for example, it is the harmonic mean $\bar{p}$ of the two parameters that will be inverted as the result:

$$\frac{1}{\bar{p}} = \frac{1}{2}\left(\frac{1}{p_1} + \frac{1}{p_2}\right)$$

A great number of possible parameter doublets $p_1$ and $p_2$ and consequently of different models for which the (reservoir or seismic) simulations will adjust to the observations corresponds to the same harmonic mean $\bar{p}$. This phenomenon can be verified with the following example of 1D simulation of a flow performed in a reservoir consisting of about twenty meshes, with a permeability $k_i$ per mesh (at the centre of the mesh). It is a trimodal medium representing a permeable medium (sandstone for example) crossed by an impermeable barrier (clay for example). One tries to know if the model inversion allows to find the permeability gradient. The data are the pressures recorded at the injection well in the course of time.

As shown in FIG. 4A, the distribution of the permeabilities obtained after inversion (graph $k_2$) with an exact gradient calculated by means of the adjoint state method is very far from the distribution used for creating the injection well data (graph $k_0$), whereas the responses of the direct model (FIG. 4B) applied to this distribution (graph $P_2$) perfectly match the data (graph $P_0$). This shows that several models, sometimes very far from the real model, can solve the inverse problem.

II) THE METHOD ACCORDING TO THE INVENTION

The method according to the invention allows to form, by means of an inversion technique, a representation of the variations, in an underground zone producing fluids, of physical quantities, constrained both by fluid production data and exploration data, these data being obtained by measurements or observations. It comprises:

selecting an a priori geologic structure of the underground zone with a distribution of at least a first physical quantity (k) estimated from exploration data and of at least a second physical quantity (σ) estimated from production data, implementing two initial direct models respectively depending on the two physical quantities, and optimizing at least one model implemented by iterative application of an inversion of at least one physical quantity, said quantities being related to one another by a combination relation, so as to obtain a representation of the structure of the zone in connection with the physical quantities considered which best meets the combination of exploration and production data.

The method comprises for example iterative optimization of the model implemented by performing a simultaneous inversion of the first physical quantity and of the second physical quantity with optimization of a global cost function depending on these two quantities.

A cost function is for example optimized, which is the sum of terms measuring the differences between the predictions of each direct model and the data obtained by measurement or observation of the corresponding quantity and of difference terms formed by taking account of said combination relation According to an embodiment, each model implemented is optimized by minimizing the objective function by determination of the exact value of the gradient thereof using the adjoint state method.

Production data are for example measurements obtained in wells through the underground zone and exploration data are seismic signals picked up by seismic receivers in response to waves transmitted in the formation, the first physical quantity is the permeability of the medium and the second physical quantity, the impedance of the medium in relation to these waves.

Production data are for example pressure measurements, exploration data are signals picked up by receivers in response to waves transmitted in the formation (elastic or seismic waves for example), the first parameter is the permeability of the medium and the second parameter is the impedance of the medium in relation to these waves (acoustic impedance for example).

The number of models likely to meet both imposed dynamic and static constraints is much more reduced. Reservoir engineers, by applying the method, therefore obtain improved models concerning reservoir characterization which allow a higher exploitation efficiency. The model obtained for the underground zone allows to better show the permeability or acoustic impedance barriers for example. Zones likely to contain hydrocarbons or zones likely to be used as storage places for gas, waste or other materials can thus be better delimited.

BRIEF DESCRIPTION OF THE DRAWINGS

Other features and advantages of the method according to the invention will be clear from reading the description hereafter of a non limitative example, with reference to the accompanying drawings wherein:

FIGS. 7A, 7B show, by way of comparison, various variation curves respectively relative to the permeability and to the bottomhole pressure of the injection well.

III) DETAILED DESCRIPTION

Figure 1:
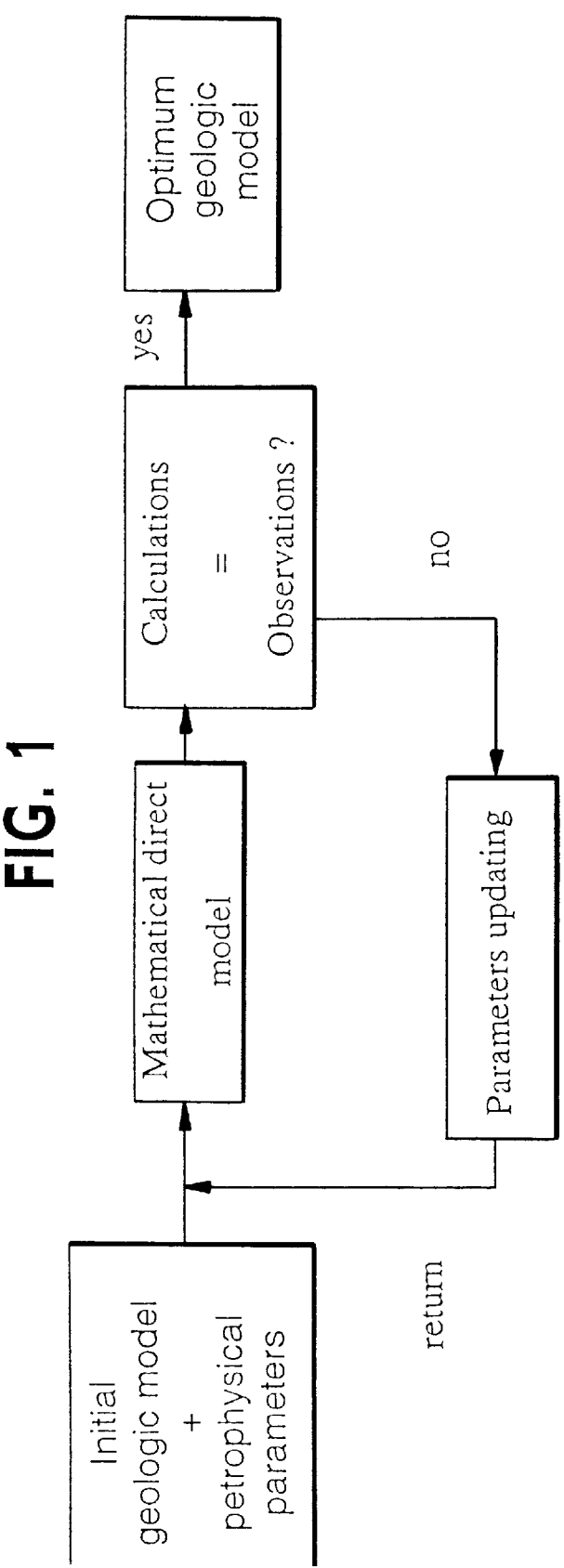
FIG. 1 shows a conventional flowchart for optimizing a model by means of an inversion procedure.
Figure 2:
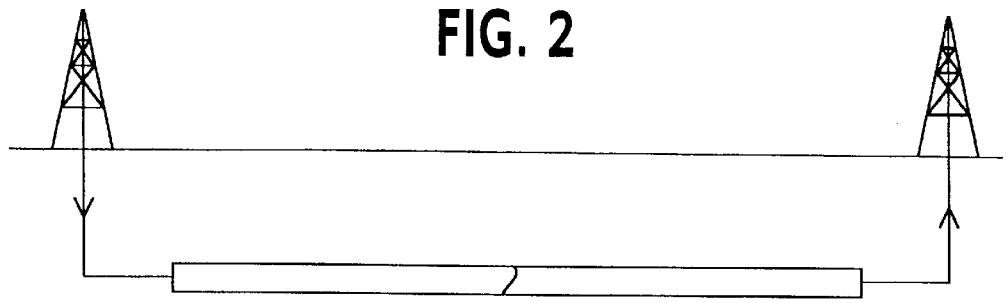
FIG. 2 is a diagram illustrating a reservoir under production.
Figure 3:
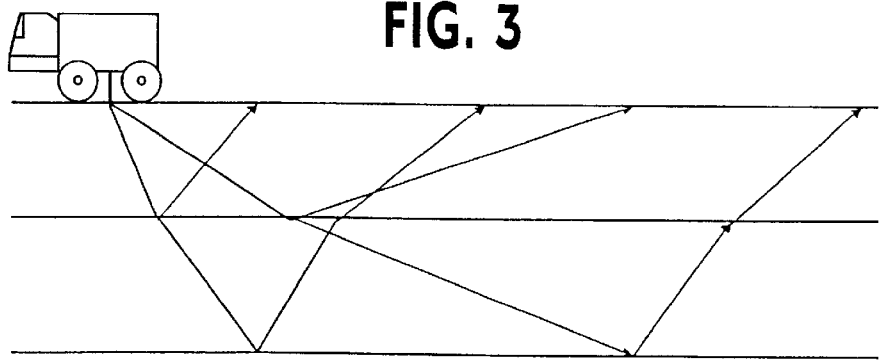
FIG. 3 is a diagram illustrating an underground zone undergoing seismic exploration.

The method according to the invention allows to form a model taking simultaneously account of all the data available, static as well as dynamic.

It essentially consists in selecting a common initial geologic structure selected a priori, information being provided with the two parameters, and in applying an inversion technique where a flow parameter (absolute permeability) and a seismic parameter (acoustic impedance) are simultaneously inverted. Connecting these two parameters allows to add information upon each inversion (seismic information is for example added as a <<regional>> constraint within the scope of a flow model) and the <<allowable>> values range of each parameter is reduced. Providing information reduces on the one hand the number of possible solutions (since a constraint is added), and it substantially improves, on the other hand, the models obtained in relation to the real model.

III-1 Permeability-impedance Relations

Coupling is achieved by using relations known to the man skilled in the art, connecting the permeability of the medium to its acoustic impedance through its porosity.

Permeability-porosity Relation

Carman's formula, which is well-known to specialists, is for example used to express the relation between permeability k and porosity $\phi$:

$$k = B\phi^3 \frac{d^2}{\tau(\phi)}$$

where B is a constant for a given medium. Parameter $k/d^2$ is a functions of $\phi^n$ ranging experimentally, according to the porosity, from 7 or more for low porosities ($\phi<5\%$) to less than 2 for unconsolidated porous media ($\phi>>30\%$).

Impedance-porosity Relation

In order to express the relation between the acoustic impedance of the medium and the porosity, we combine for example Wyllie's equations for sonic log $\Delta t$ and for density log $\Phi$ to express the acoustic impedance according to the petrophysical parameters of the medium, notably porosity $\phi$.

For formations without clay, the relations between the logging data are:

$$\Delta t = \phi \Delta t_f + (1-\phi)\Delta t_{ma}$$

$$\Phi = \phi \Phi_f + (1-\phi)\Phi_{ma}$$

By combining the previous relations, knowing that the impedance $\sigma = \Phi V = \Phi/\Delta t$, we obtain:

$$\phi = \frac{\varphi_{ma} - \sigma \cdot \Delta t_{ma}}{\sigma(\Delta t_f - \Delta t_{ma}) - (\varphi_f - \varphi_{ma})}$$

with:

$\phi$: porosity $\sigma$: acoustic impedance $\Phi_f$ and $\Delta t_f$: density and transit time of formation $\Phi_{ma}$ and $\Delta t_{ma}$: density and transit time of nature.

If $\sigma$ is to expressed as a function of $\phi$, we obtain:

$$\sigma = \frac{\varphi_{ma} + \phi(\varphi_f - \varphi_{ma})}{\phi(\Delta t_f - \Delta t_{ma}) + \Delta t_{ma}}$$

For a formation with clay, logs $\Delta t$ and $\Phi$ are expressed as a function of the same parameters by the following relations:

$$\Delta t = \phi \Delta t_f + (1-\phi-V_{sh})\Delta t_{ma} + V_{sh}\Delta t_{sh}$$

$$\Phi = \phi \Phi_f + (1-\phi-V_{sh})\Phi_{ma} + V_{sh}\Phi_{sh}$$

which gives, by combining them:

$$\phi = \frac{(1-V_{sh})(\varphi_{ma} - \sigma \cdot \Delta t_{ma}) + V_{sh}(\varphi_{sh} - \sigma \cdot \Delta t_{sh})}{\sigma \cdot (\Delta t_f - \Delta t_{ma}) - (\varphi_f - \varphi_{ma})}$$

with:

$V_{sh}$: percentage of clay $\Phi_{sh}$ and $\Delta t_{sh}$: density and transit time of clay Permeability-impedance Relation By combining Wyllie's equations with Carman's equations, we obtain a direct relation between the permeability of the medium and its acoustic impedance. For a formulation without clay, we have:

$$k = B\left(\frac{\varphi_{ma} - \sigma \cdot \Delta t_{ma}}{\sigma \cdot (\Delta t_f - \Delta t_{ma}) - (\varphi_f - \varphi_{ma})}\right)^3 \frac{d^2}{\tau(\phi)}$$

and, for a formation with clay, we have:

$$k = B\left(\frac{(1-V_{sh})(\varphi_{ma} - \sigma \cdot \Delta t_{ma}) + V_{sh}(\varphi_{sh} - \sigma \cdot \Delta t_{sh})}{\sigma \cdot (\Delta t_f - \Delta t_{ma}) - (\varphi_f - \varphi_{ma})}\right)^3 \frac{d^2}{\tau(\phi)}$$

Note the relation f: we thus have k=f ($\sigma$).

Coupling

The two problems can be coupled by thus connecting the two parameters k and $\sigma$. We start from a meshed initial geologic structure with an impedance and a permeability in each mesh, related by relation f By applying to this structure the modelling equations forming the two direct (flow and seismic) models or others used in simulators of a well-known type: a seismic simulator such as Interwell™ for example and a reservoir simulator such as Athos™, we obtain pressure (at the injection well) and vibration (at the surface) responses. The cost function is then calculated. It is the sum of the two cost functions of each problem and of a term measuring the differences between the permeabilities and the impedances in each mesh, calculated by means of function f $$j(k, \sigma) = \frac{1}{2}\int_0^T (p(0,t) - \hat{p}(t))^2 dt +$$

$$\frac{1}{2}\int_0^T (y(0,t) - \hat{y}(t))^2 dt + \frac{1}{2}\|k - f(\sigma)\|^2 + \frac{1}{2}\|\sigma - f^{-1}(k)\|^2$$

Figure 5:
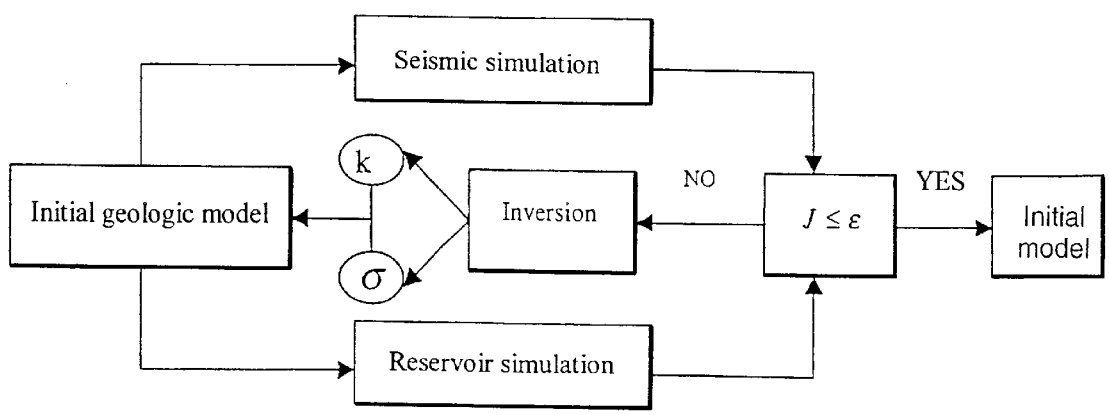
FIG. 5 shows the combined inversion flowchart according to the invention.
Figure 4B:
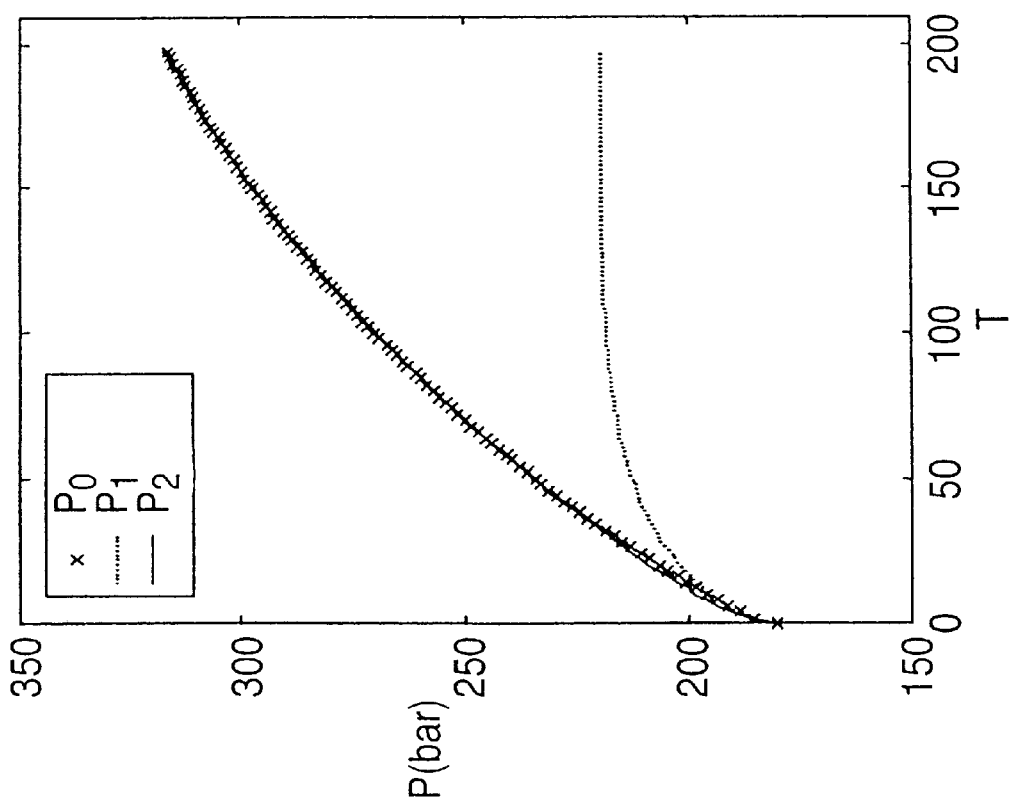
FIGS. 4A, 4B illustrate the possible dispersion of the models due to insufficient constraint data.
Figure 4A:
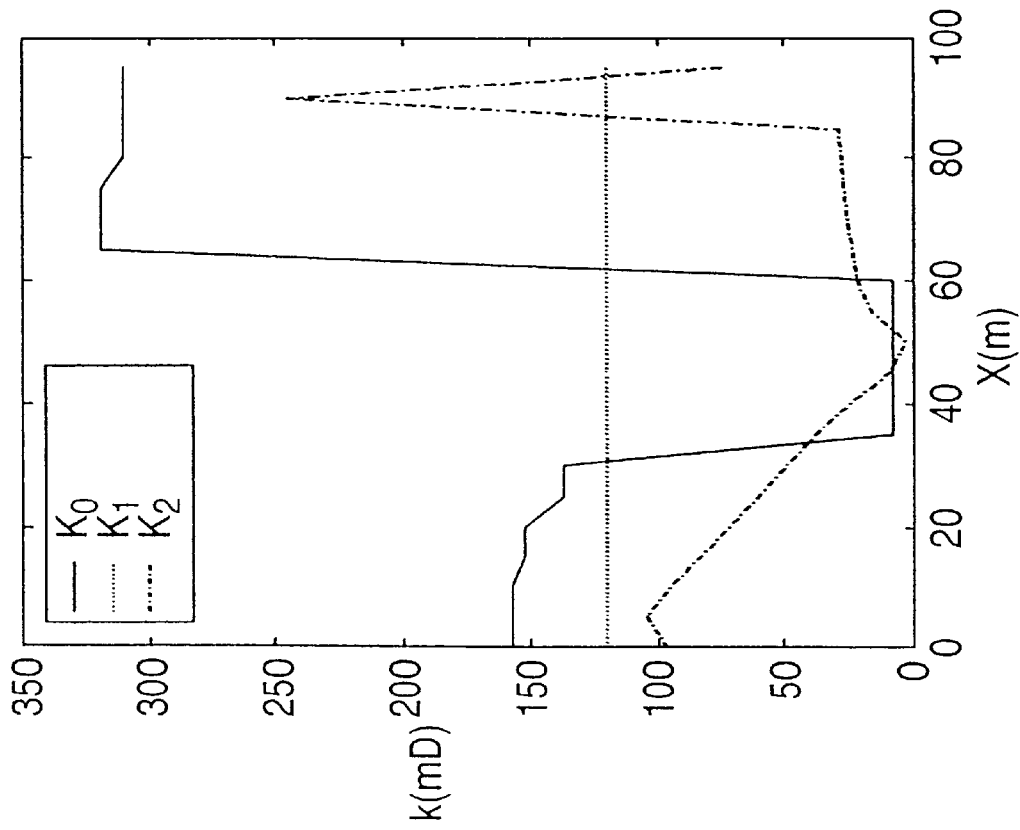

Inversion is performed according to the flowchart of FIG. 5 by using, again here, the adjoint state method for exact calculation of term $\nabla J$. Each parameter (permeabilities and impedances) is then updated until a model matching the data is obtained.

IV) RESULTS

The example hereafter clearly shows that adding seismic data to flow test results improves the inversion of parameters k and σ, and that coupling allows to find information that would otherwise be lost with a conventional inversion, such as high gradients in the distribution of the two parameters.

Numerical Results

Figure 6:
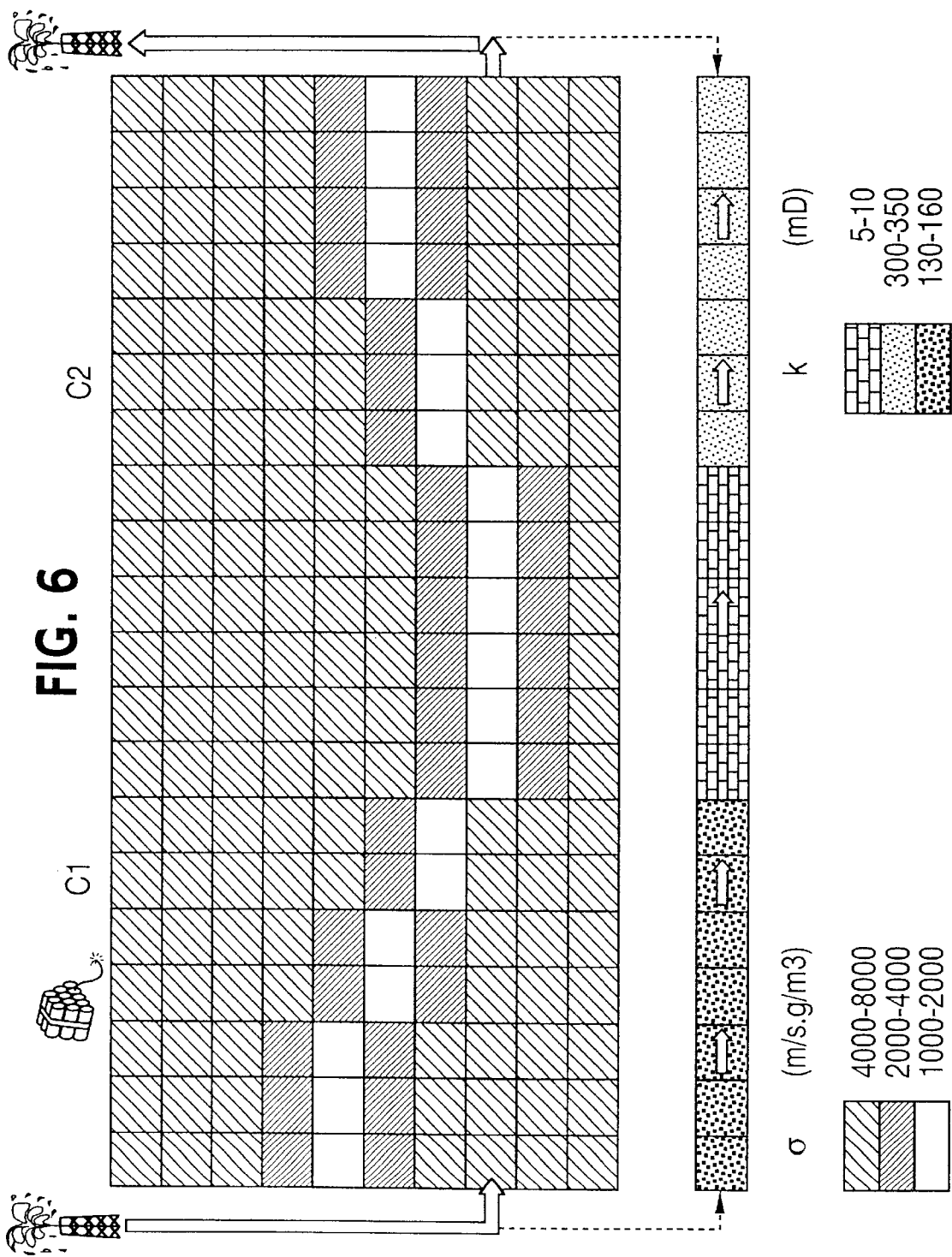
FIG. 6 shows an a priori synthetic model formed from a reservoir structure under development, used to validate the method, with a distribution of acoustic impedance and permeability values.

The synthetic model of FIG. 6, formed from a known geologic example, has been used with the given impedance and permeability value distributions.

Figure 8B:
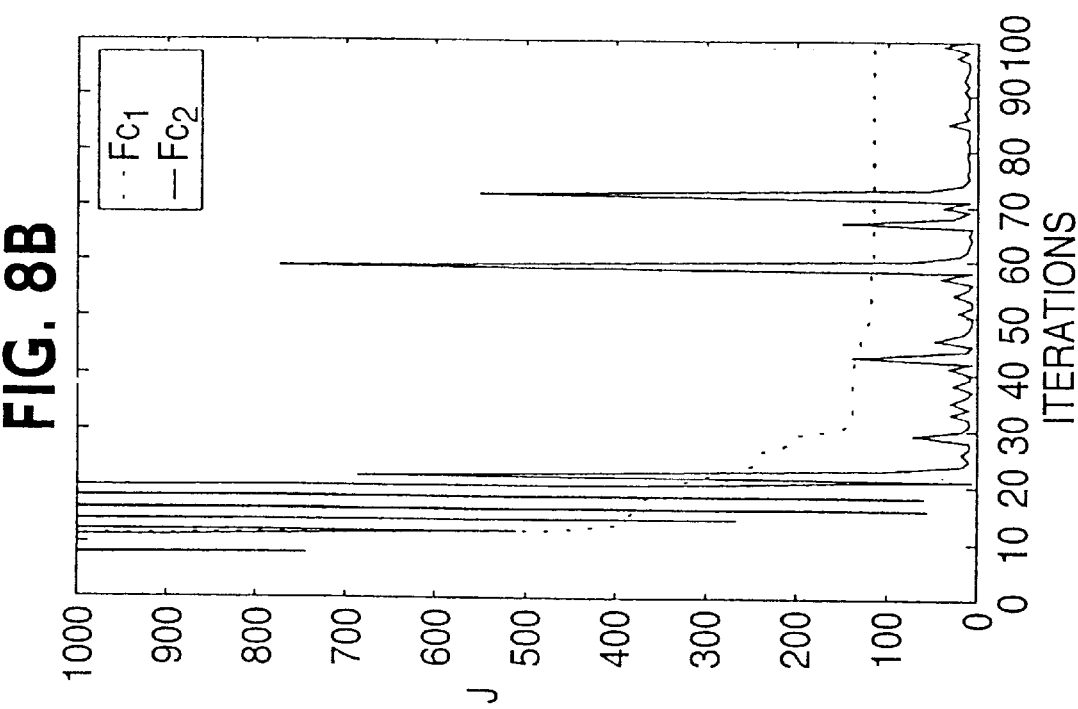
FIGS. 8A, 8B show, by way of comparison, various variation curves respectively relative to the permeability and to the cost function according to the number of iterations, in the case of a conventional inversion and of an inversion with the method according to the invention, K1, K2, K3 respectively corresponding to iterations of order 100, 200 and 300.
Figure 8A:
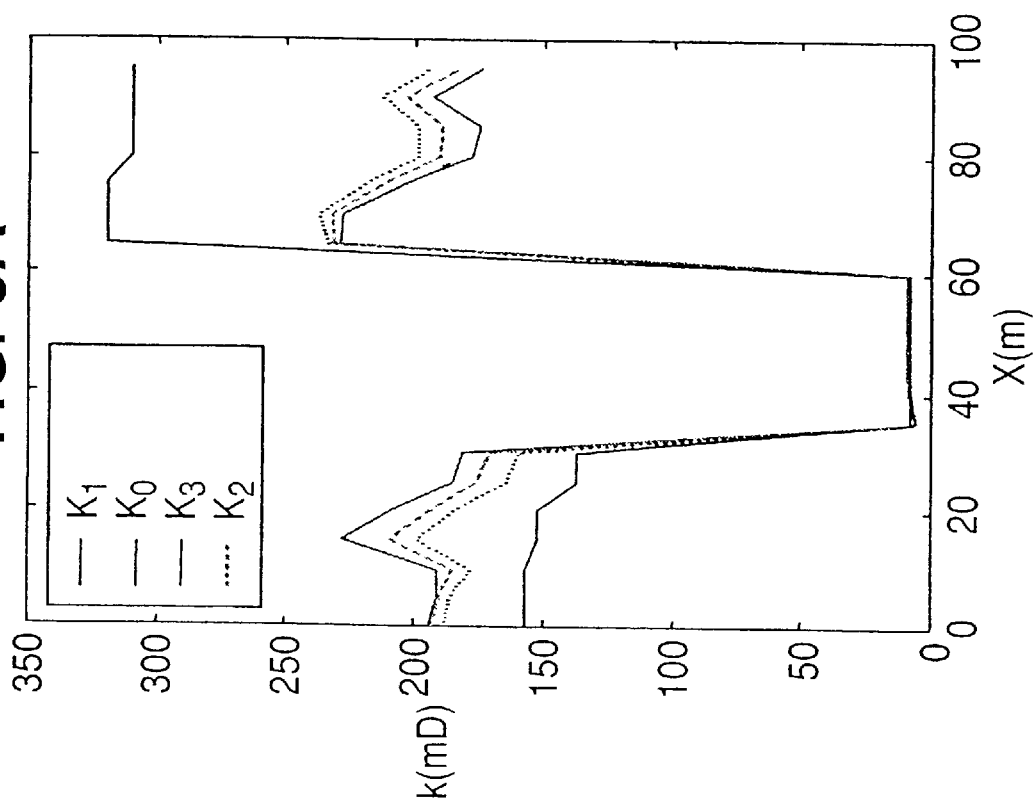

It can immediately be noticed (FIGS. 7A, 7B) that the permeability distribution found by means of the coupled method (graph K3) is much closer to the desired distribution, used for creating the data (graph K0), than that (graph K2) calculated by means of the conventional method. The corresponding pressure response (graph P2) is perfectly adjusted to the data fixed for the injection well (graph P0). The main result is that the permeability jump (its position and its relative amplitude) is reproduced in the distribution found by applying the method, whereas it is greatly <<smoothed>> with a conventional method. Furthermore, the operation is faster as can be seen (FIG. 8A) by comparing the results for the same cost function, i.e. $J(k)=\frac{1}{2}\int_0^T(p(0,t)-\hat{p}(t))^2 dt$. Although that of the coupled inversion exhibits certain oscillations (graph Fc2 in FIG. 8B), it remains much lower, from a certain value, than that of the conventional inversion (graph Fc1), practically at each iteration increment. Both the quality of the result and the calculating time are thus improved.

Figure 9B:
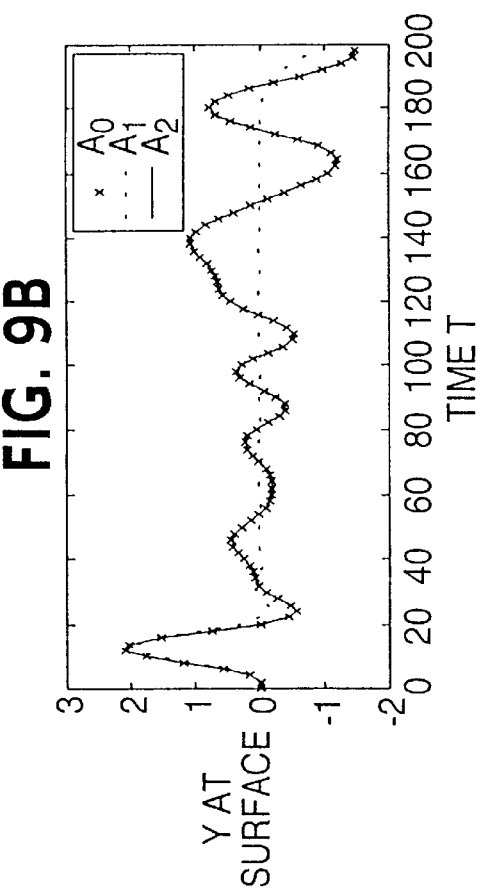
FIGS. 9A, 9B, 9C show, by way of comparison, various variations curves respectively relative to the acoustic impedance as a function of the traveltime of the waves (FIG. 9A), to the amplitude of the vibrations picked up by surface seismic receivers (FIG. 9B) and to the cost functions in the case of a conventional inversion and of a coupled inversion (FIG. 9C), all these variations corresponding to a first column of the synthetic model of FIG. 5, and FIGS. 10A, 10B, 10C show the same variation curves obtained for another column of the same synthetic model
Figure 9C:
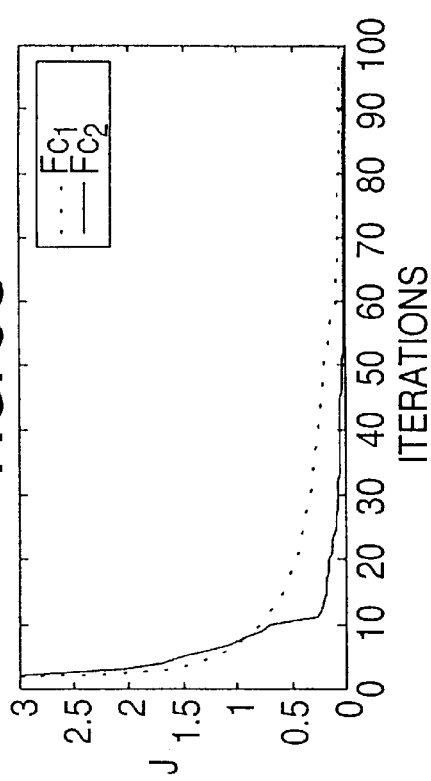
Figure 9A:
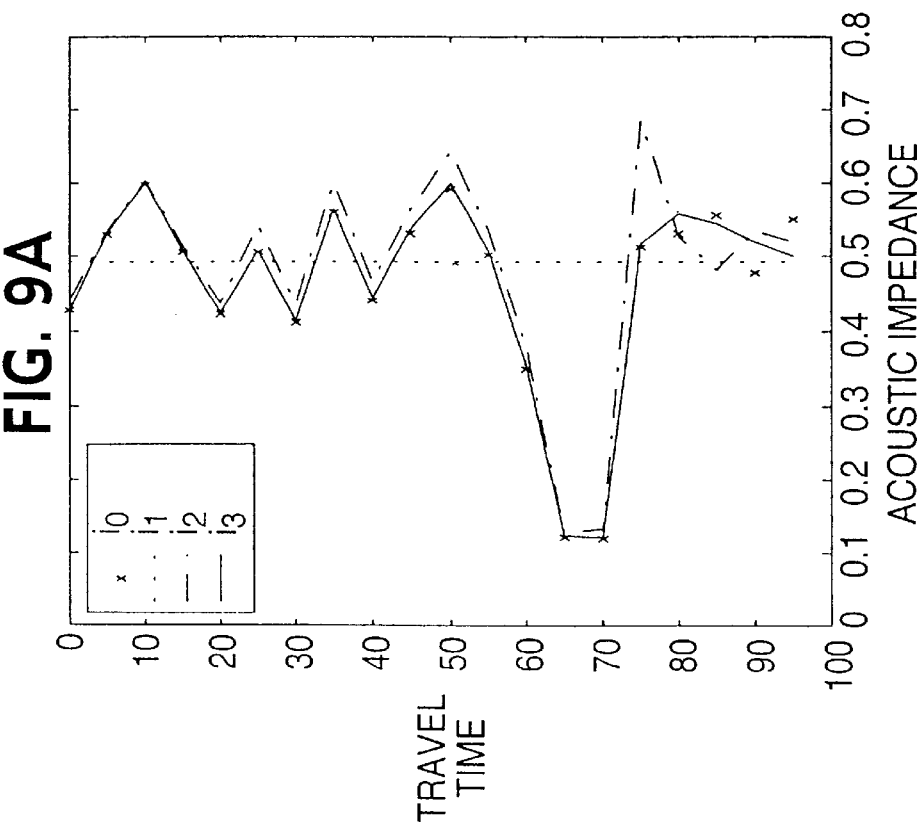
Figure 10B:
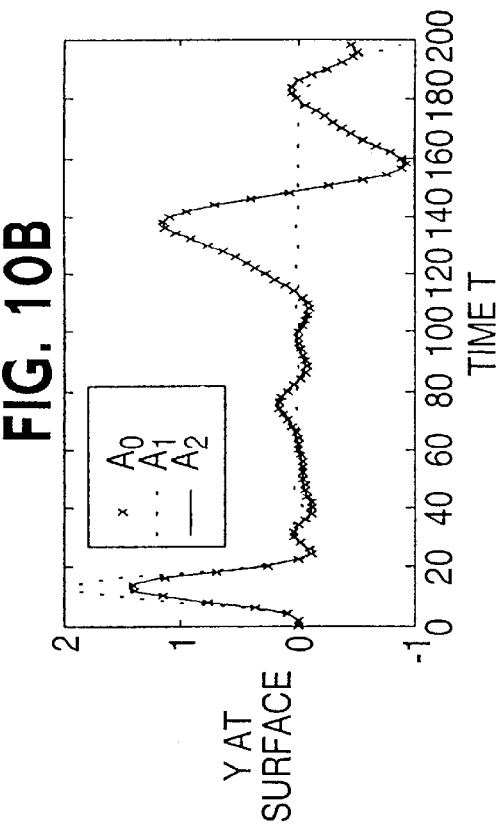
Figure 10C:
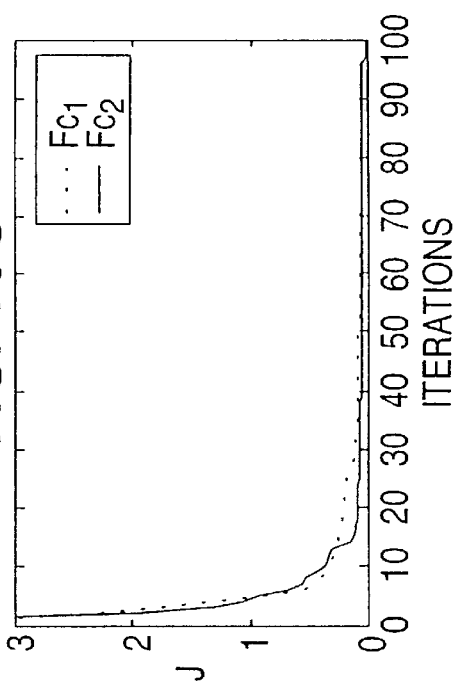
Figure 10A:
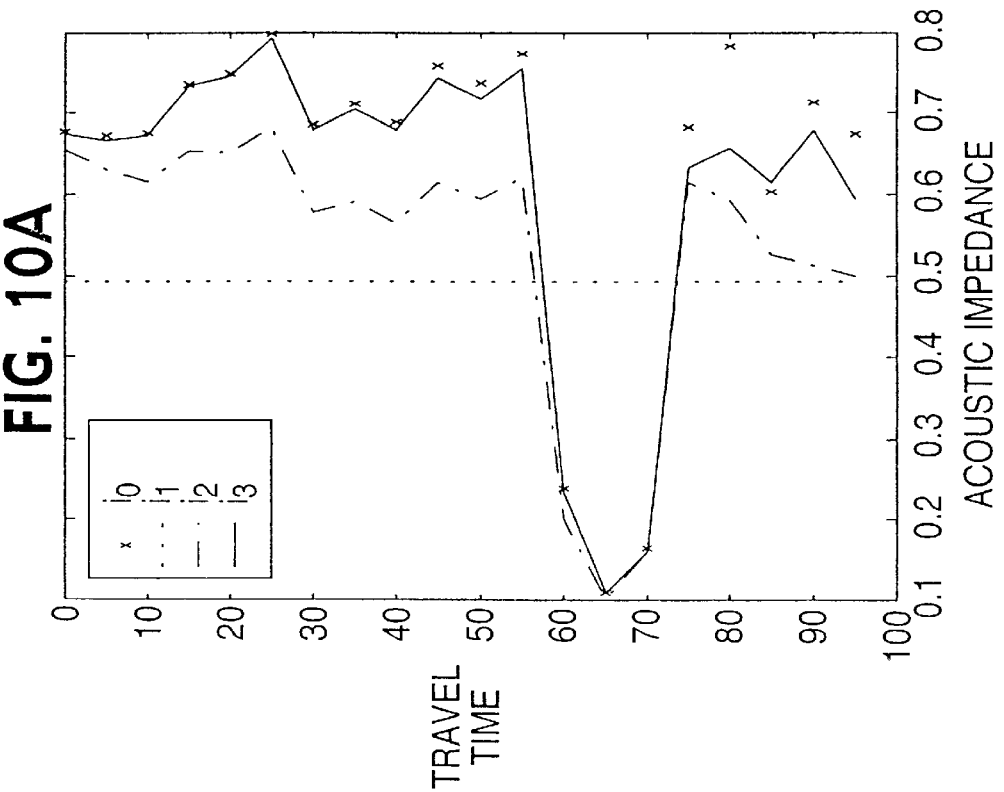

FIGS. 9, 10 show the compared results obtained for the distribution of the impedances, of the surface vibrations and of the cost functions for two different columns of the synthetic model selected.

For the first column C1 (FIG. 9A), it can be seen that the coupled calculation (graph i3) leads to a noticeable improvement concerning the exact value of the points, which here perfectly match the desired values (graph i0). The main improvement comes from the algorithm speed, because the diagram (FIG. 9C) shows that the cost function of the coupled calculation (graph Fc2) decreases much faster than that of the conventional calculation (graph Fc1). The same function has been compared here again, i.e.

$$J(\sigma)=\tfrac{1}{2}\int_0^T(y(0,t)-\hat{y}(t))^2 dt.$$

Concerning the other column C2 (FIG. 10) of the synthetic seismic model, it can be seen (FIG. 9A) that the impedance distribution obtained by means of the coupled method (graph i3) is totally in accordance with the desired impedances (graph i0), which is far from being the case with the distribution obtained with the conventional inversion (graph i2).

It can thus be seen with these two examples that the improvement provided by the method according to the invention is significant, that it concerns both the speed of the calculating times, with an objective function that decreases faster than with a conventional inversion, and the impedance values found after inversion, values that are closer to those of the desired distribution.

What is claimed is:

1. A method for automatically forming, by means of an inversion technique, a representation of variations, in an underground zone producing fluids, of physical quantities, constrained both by fluid production data and exploration data, these data being obtained by measurements or observations, characterized in that it comprises:

selection of an a priori geologic structure of the underground zone with distribution of at least a first physical quantity (k) estimated from exploration data and of at least a second physical quantity (σ) estimated from production data, implementation of two initial direct models respectively depending on the two physical quantities, and optimization of at least one model implemented by iterative application of an inversion of at least one physical quantity, said quantities being related to one another by a combination relation, so as to obtain a representation of the structure of the zone in connection with the physical quantities considered, best meeting the exploration and production data combination.

2. A method as claimed in claim 1, characterized in that it comprises iterative optimization of the model implemented by performing simultaneous inversion of first physical quantity (k) and of second physical quantity (σ) with optimization of a global cost function J(k,σ) and depending on these two quantities.

3. A method as claimed in claim 2, characterized in that a cost function J(k,σ) is optimized, which is the sum of terms measuring the differences between the predictions of each direct model and the data obtained by measurement or observation of the corresponding quantity and of difference terms formed by taking account of said combination relation.

4. A method as claimed in claim 1 characterized in that each model implemented is optimized by minimizing the objective function through determination of the exact value of the gradient thereof, using the adjoint state method.

5. A method as claimed in claim 1 characterized in that the production data are measurements obtained in wells through the underground zone and the exploration data are seismic signals picked up by seismic receivers in response to waves transmitted in the formation, the first physical quantity is the permeability of the medium and the second physical quantity is the impedance of the medium in relation to these waves.

* * * * *